J. ROBINSON.
RADIODIRECTION FINDER.
APPLICATION FILED NOV. 12, 1918.

1,435,941.

Patented Nov. 21, 1922.
4 SHEETS—SHEET 1.

Witnesses

Inventor
James Robinson
By Sturtevant & Mason
Attorneys

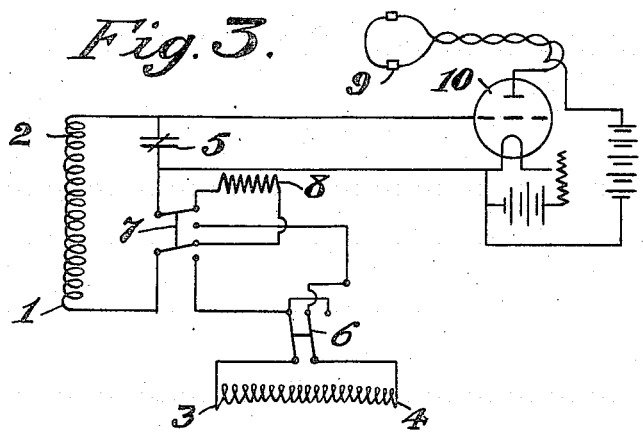
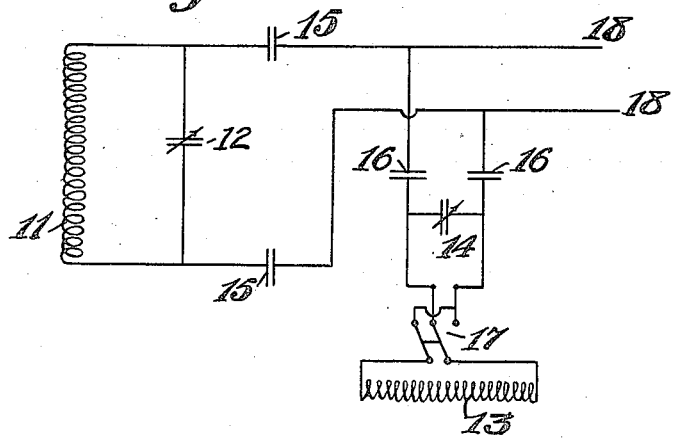
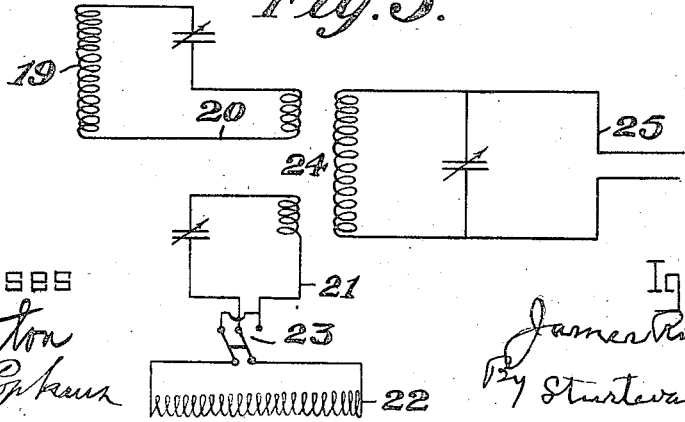

J. ROBINSON.
RADIODIRECTION FINDER.
APPLICATION FILED NOV. 12, 1918.

1,435,941.

Patented Nov. 21, 1922.
4 SHEETS—SHEET 3.

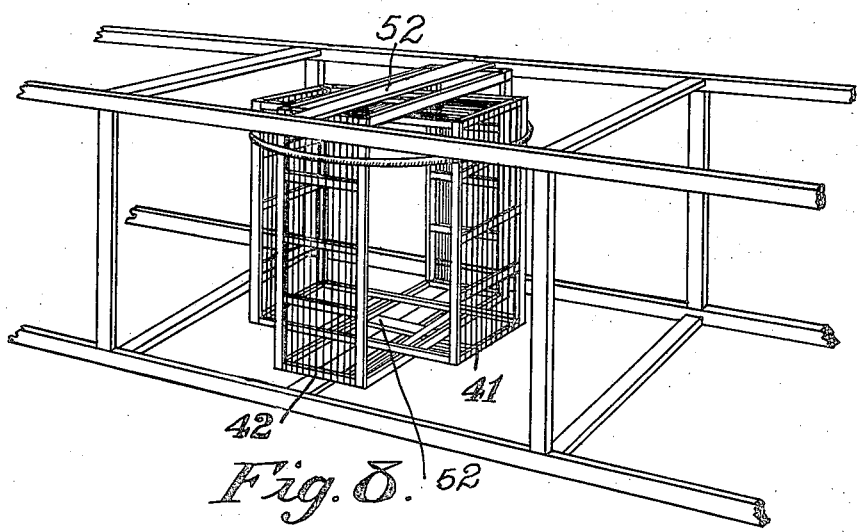

Patented Nov. 21, 1922.

1,435,941

UNITED STATES PATENT OFFICE.

JAMES ROBINSON, OF ANDOVER, ENGLAND.

RADIODIRECTION FINDER.

Application filed November 12, 1918. Serial No. 262,141.

*To all whom it may concern:*

Be it known that I, JAMES ROBINSON, subject of the King of Great Britain, residing at Andover, Hants, in the Kingdom of England, have invented certain new and useful Improvements in Radiodirection Finders, of which the following is a specification.

The present invention relates to improvements in electro-magnetic arrangements for the reception of wireless waves, in which the direction of arrival of such waves from some remote point may be determined.

It is known that when an electrical circuit having characteristics suitable for the reception of electro-magnetic waves is arranged in the form of a closed coil or loop, the intensity of the signals received upon it from a remote transmitting station will be at a maximum when the plane of the coil coincides with the direction of propagation or arrival of the waves, and at a minimum when the coil is at right angles to the incoming waves; by rotating such a coil about an axis it will therefore be possible to discover the bearing of the transmitting station.

In one previous arrangement two aerials fixed in space at right angles to one another are connected in independent circuits arranged to be absolutely similar in characteristics as regards the reception of electromagnetic waves, these circuits including inductances at right angles to one another, and which latter are inductively coupled to a moving coil mounted between them. Any dissimilarity in tuning of the two aerial coils will have a serious effect on the accuracy of the bearing to be obtained when determining the direction of the incoming waves by means of the rotating coil.

In an alternative arrangement, a single aerial coil is used on a rotatable frame, the signals being heard after amplification by a suitable amplifier.

Now while in these systems advantage is taken of the fact that, in the determination of a bearing, the rate of variation of the intensity of the signal with the angular movement of the coil is large when the plane of the coil is in a position approximating to a right angle with the direction of the incoming waves, and is small when the plane of the coil is parallel thereto, yet the very considerable disadvantage is present that in practice it is not possible to determine, with accuracy, the position of zero or minimum signal. It is obvious that a whole region will be present where no signals will be distinguishable, and this region will also be abnormally increased by any extraneous noise such as would be present if the arrangement were fitted to an aircraft, taken by way of example. Consequently it was necessary to estimate the point of extinction of the signals, or again the equality of two extremely weak signals on each side of this zero or minimum point and to determine this latter by a mean of the two points obtained. Not only is some time necessarily occupied in taking the two readings and estimating their mean but further this arrangement will usually preclude the interpretation of the signals during this time.

According to the present invention a pair of aerial coils in vertical planes are set at an angle to one another, preferably at a right angle, and are rotated about a vertical axis until no appreciable difference in strength of signal is found, when the effect of that coil which lies at right angles to the direction of arrival of the waves (the bearing of which is desired) is superposed positively or negatively upon the effect of the other coil. The bearing can then obviously be determined by the position of the first coil.

In the case of coils actually at right angles the position for the reception of maximum signals by one coil, can be roughly determined, and then by the superposition of the other coil this maximum position can be definitely fixed.

Not only does this arrangement represent a considerable saving of time in the determination of a bearing but it is now possible to appreciate and interpret signals, simultaneously and without interruption, the whole time that their direction is being determined. Further by this system a greater range is obtainable than heretofore, as weaker signals can be utilised for equal conditions of aerial coil and amplifying device, than would be possible in the previous minimum or extinction signal method mentioned above.

The invention is more particularly described with reference to the accompanying diagrammatic drawings in which:—

Figure 3 shows a method of combining the main and auxiliary coils.

Figures 4, 5 and 6 are diagrammatic views of alternative arrangements.

Figure 8 shows diagrammatically a method of fitting the coils to an aircraft.

Figure 1:
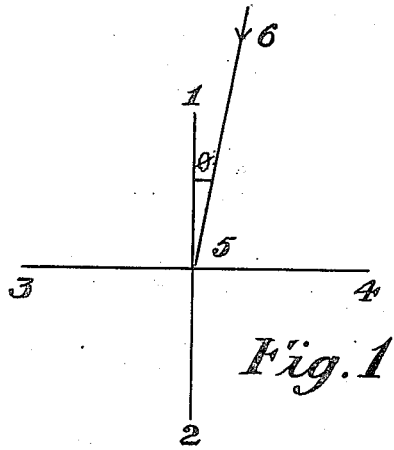
Figure 1 is a diagram of the coils.
Figure 2:
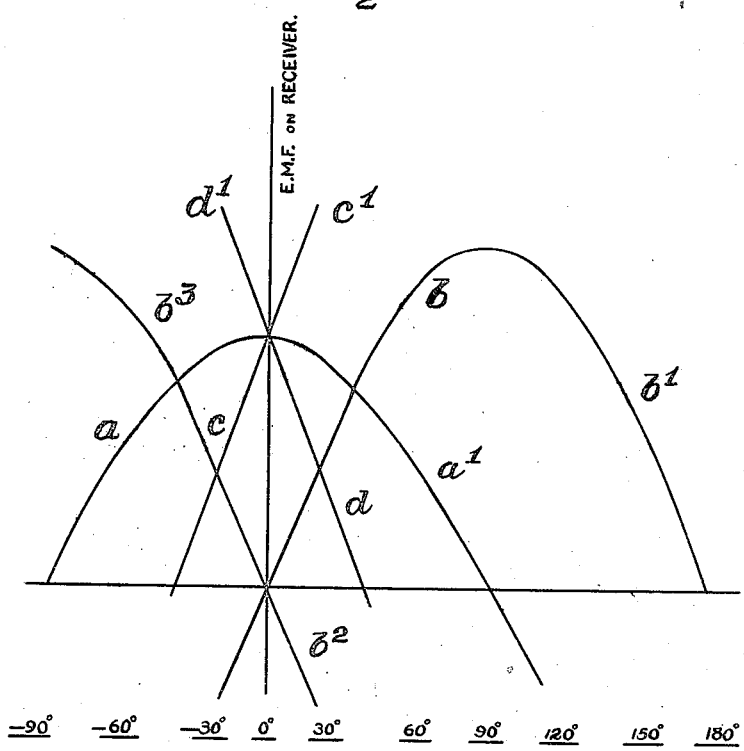
Figure 2 shows graphically the electromotive force in the coils at varying angles.

Referring to Figs. 1 and 2 if 1, 2, be taken to represent the main coil and 3, 4 the auxiliary coil rigidly fixed together and moving about an axis 5 then a wireless wave signal arriving the direction 6, 5 making an angle $\theta$ with the main coil 1, 2 will cause an E. M. F. in the two coils $e_1$ and $e_2$ corresponding to $$e_1 = E_1 \cos \theta$$

and $$e_2 = E_2 \sin \theta$$

where $E_1$ and $E_2$ are constants depending only on the dimensions of the coils. A certain resultant fraction only, say $e_3$, will be effective in the receiver and $$e_3 = kE_1 \cos \theta - k_2 E_2 \sin \theta.$$

The rate of variation of $e_3$ with $\theta$ is therefore $$\frac{de_3}{d\Theta} = - kE_1 \sin \Theta - k_2 E_2 \cos \Theta.$$

Where $\theta$ is small this approximates to $-k_2 E_2 \cos \theta$.

The amplitude of this variation can be adjusted by taking a suitable value for $k_2 E_2$, that is to say suitably selecting the constants for the auxiliary coil and the coupling to the receiver.

The E. M. F.'s in the two coils for any angle $\theta$ subtended by the direction of the arrival of the wave and the plane of the main coil, and the result of combining these in a receiver are graphically indicated in Fig. 2. Here the E. M. F. generated in the main coil 1, 2 alone and available at the receiver is $k_1 e_1$ or $k_1 E_1 \cos \theta$ and is represented by the curve $a\ a'$. Similarly $b\ b'$ is the curve for the auxiliary coil 3, 4 and corresponds to an E. M. F. $k_2 e_2$ or $k_2 E_2 \sin \theta$. The resultant curve when the two coils are connected in series (or otherwise combined to give an additive effect) and when the coil 1, 2 is near the maximum is shown at $c\ c'$.

Now it is obvious that as 1, 2 and 3, 4 are at right angles to one another $c\ c'$ cuts $a\ a'$ at the maximum point of the latter and consequently the introduction of the auxiliary coil makes no difference in the strength of the signals, while for points on one side of the maximum the signals are strengthened and for those on the other side are weakened. The accuracy with which the points of intersection of $a\ a'$ and $c\ c'$ can be determined depends on the steepness of $c\ c'$, since it is on this that the change of strength on switching in or out the auxiliary coil depends.

If the auxiliary coil is turned through 180° or, as is preferred, has its connections reversed, the E. M. F. due to it will now be represented by the curve $b^2\ b^3$ and the resultant of $a\ a'$ and $b^2\ b^3$ is $d\ d'$. By this it will be seen that the change of strength obtained by working on curves $c\ c'$ and $d\ d'$ is double that which would be obtained by using $c\ c'$ and $a\ a'$ or $d\ d'$ and $a\ a'$.

In one arrangement as shown in Fig. 3 the two coils (1) (2) and (3) (4) are placed in series with one another, and with a tuning condenser (5) the auxiliary coil (3) (4) being connected by means of a reversing switch (6), a switch (7) allowing the main coil (1) (2) to be used alone or in series with the coil 3, 4. The switch (6) also preferably inserts an inductance (8) of the same value as (3) (4) whenever this coil (3) (4) is disconnected from (1) (2). The change in degree of strength on operating the switch (7) is found by listening in on the telephone or the like (9) connected to the amplifier (10) such as an oscillation valve.

In the modification of Fig. 4 a coil (11) is arranged in a closed circuit tuned to the desired wave length by a variable condenser (12). This coil (11) is arranged in parallel with an auxiliary coil (13) similarly tuned by means of the variable condenser (14) and arranged at right angles to the coil (11). Condensers (15) are inserted in the leads to the coil (11) and condensers (16) in the leads to the coil (13) to prevent mutual disturbing effects of one aerial coil on the other. The coil (13) is controlled as before by a reversing switch (17). The leads (18) are connected to the amplifier as before.

With this arrangement of the coil 13 in parallel with the coil 11 it will be found that if the coil 13 is opposed to the coil 11 a decreased intensity of signal will be received as compared with that received on the operation of the reversing switch 17.

In the modification of Fig. 5 the main coil (19) is in a separate tuned circuit (20) to the tuned circuit (21) containing the auxiliary coil (22) which circuit again includes a reversing switch (23). These circuits are inductively coupled as at (24) to the amplifier and receiver circuit (25).

Figure 6:
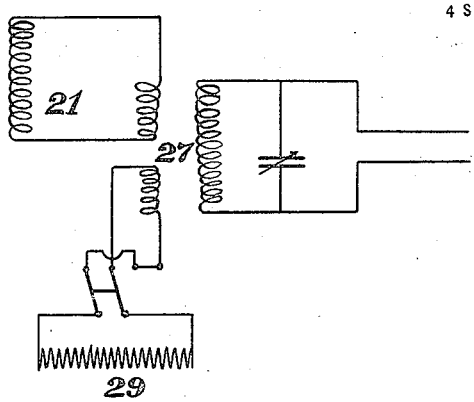

In Fig. 6 by adopting a very close coupling (27) it will be possible to avoid the necessity for tuning the circuits (21), (29) of the main and auxiliary coils respectively.

Figure 7:
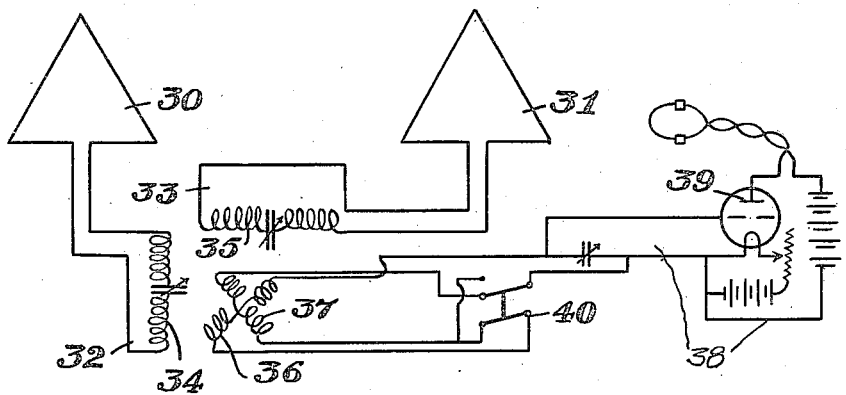
Figure 7 is a further modification.

In the arrangement of Fig. 7 a pair of aerial coils (30) and (31) are fixed and at right angles to one another. They are each in a separate tuned circuit (32) and (33) respectively including inductances (34) and (35) at right angles to one another. Between these inductances (34) and (35) is arranged, movable about an axis, a pair of coils (36) and (37) at right angles to one another. These coils are connected in series with a receiver and amplifier circuit (38), one coil (37) being reversible by means of the switch (39). In this latter case instead therefore of finding the bearing by rotating the main aerial coils, the subsidiary coils are rotated.

If incoming waves make an angle $x$ degrees with the coil (30) they will make an angle of (90—$x$) degrees with the coil (31). If the signal is of strength $y$ then this will have an effect in the coil (30) equivalent to $y \cos x°$, and an effect on coil (31) of $y \sin x°$.

It will be obvious therefore that if the coils (36) and (37) be turned into such a position that one makes an angle $x°$ with the inductance (32) and (90—$x°$) with the inductance (35), then the signals heard in the two coils (36) and (37) will once again be equal, and so by turning the coils so that signals are heard in equal strength when the reversing switch (40) is operated, the angle $x$ degrees made with the inductances, and hence the bearing of the direction of reception of the signal waves, can be found as described with reference to Fig. 2.

Figure 8 shows one method of fixing the coils in an aircraft, the coils (41) and (42) being revolvable about a fixed vertical axis 52 in the fuselage of the machine.

The arrangement of the present invention will therefore be particularly suitable for ascertaining the bearing of any wireless waves, subtended at the receiving station, whether this be on land or whether this be on an aircraft, vessel on the sea, land vehicle or otherwise; when such bearings will be useful as a means of navigation.

I declare that what I claim is:—

1. A radio direction finder comprising a pair of movable aerial coils arranged at a fixed angle to one another, a radio receiver connected thereto so that the combined effect of the incoming radio waves on the two coils is received, means to cut out temporarily one movable coil, and means to insert an equivalent inductance in the circuit.

2. A radio direction finder comprising a pair of movable aerial coils arranged at a fixed angle to one another, a radio receiver connected thereto so that the combined effect of the incoming radio waves upon the two coils is received, means to reverse the effect of the radio waves upon one coil, means to cut out temporarily one moving coil, and means to insert an equivalent inductance in the circuit.

3. A radio direction finder comprising a pair of movable aerial coils arranged at a fixed angle to one another, a reversing switch in one coil, a radio receiver connected so that the combined effect of the incoming radio waves on the two coils is received, means to cut out temporarily one moving coil, and means to insert an equivalent inductance in the circuit.

4. In a radio direction finder a plurality of directive aerial receptors mounted at a fixed angle to one another, means to turn said aerial receptors about an axis in their own plane and means adapted to allow a comparison between the sum and the difference of the effects produced in the respective aerial receptors.

5. A radio direction finder comprising in combination a pair of aerial coils arranged at a fixed angle to one another, a radio receiver connected thereto, means to move said coils about a pivot so that the combined effect of the incoming radio waves on the two coils is a maximum and means to reverse the connections of one coil only in order to add algebraically the effect of this coil to that of the other.

6. A radio direction finder comprising in combination a pair of aerial coils arranged at an angle to one another and pivoted about an axis forming the intersection of the planes of the coils, means to move said coils about a pivot so that the combined effect of the incoming radio waves on the two coils is a maximum and means to reverse the connections of one coil only in order to add algebraically the effect of this coil to that of the other.

7. A radio direction finder comprising in combination an aerial coil, a tune circuit containing said coil, a second aerial coil fixed at a right angle to the first coil, a second tuned circuit containing said second coil, a radio receiver connected to said tuned circuits, and means to move said coils about a pivot so that the combined effect of the incoming radio waves on the two coils is a maximum, and means to reverse the connections of one coil only in order to add algebraically the effect of this coil to that of the other.

In witness whereof, I have hereunto signed my name this 21st day of October, 1918, in the presence of two subscribing witnesses.

JAMES ROBINSON.

Witnesses:
JOSEPH SMITH,
ROBERT WATSON.